Nov. 28, 1939.        J. W. WHITE         2,181,754
            HYDRAULIC TRANSMISSION
            Filed Jan. 22, 1937        6 Sheets-Sheet 2

INVENTOR.
JOHN W. WHITE
BY Jerome R. Cox
ATTORNEY.

Nov. 28, 1939.   J. W. WHITE   2,181,754
HYDRAULIC TRANSMISSION
Filed Jan. 22, 1937   6 Sheets-Sheet 3
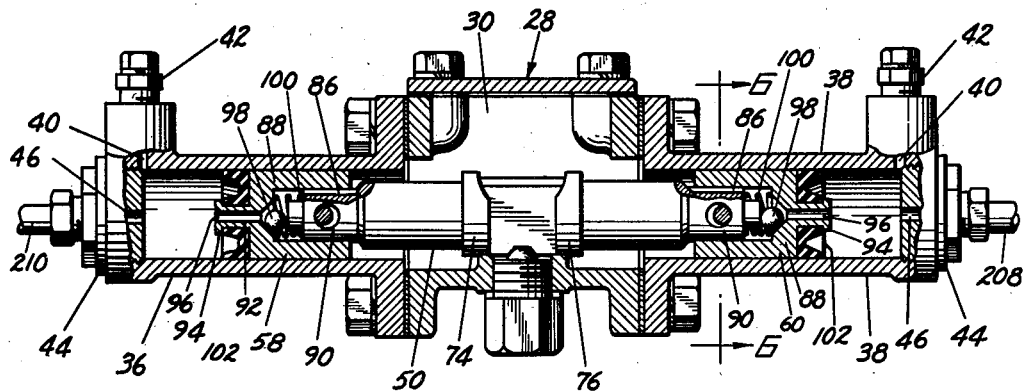
Fig. 4.
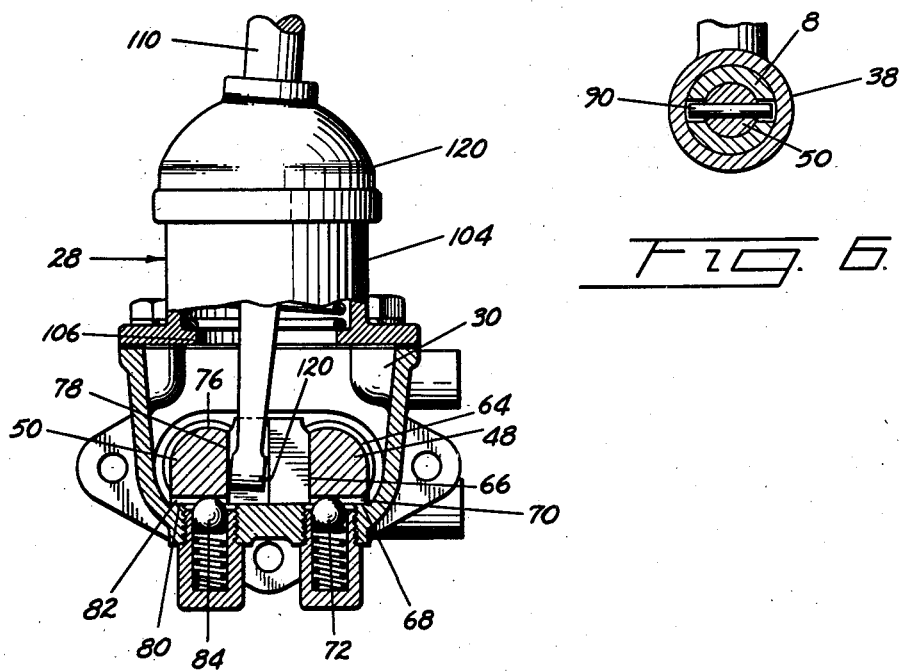
Fig. 5.
Fig. 6.
INVENTOR.
JOHN W. WHITE
BY Jerome R. Cox
ATTORNEY.

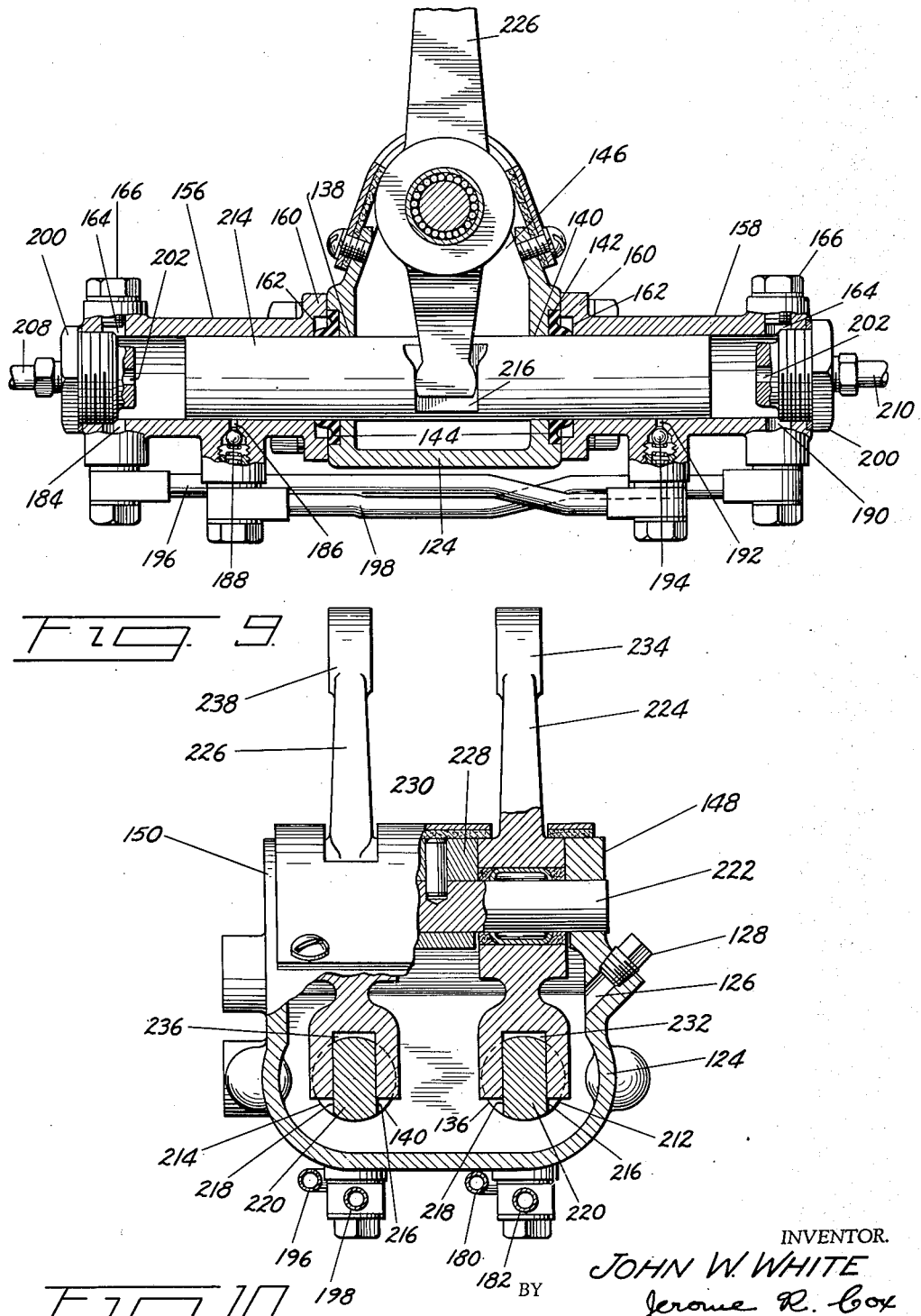

Nov. 28, 1939.　　　J. W. WHITE　　　2,181,754
HYDRAULIC TRANSMISSION
Filed Jan. 22, 1937　　　6 Sheets-Sheet 6
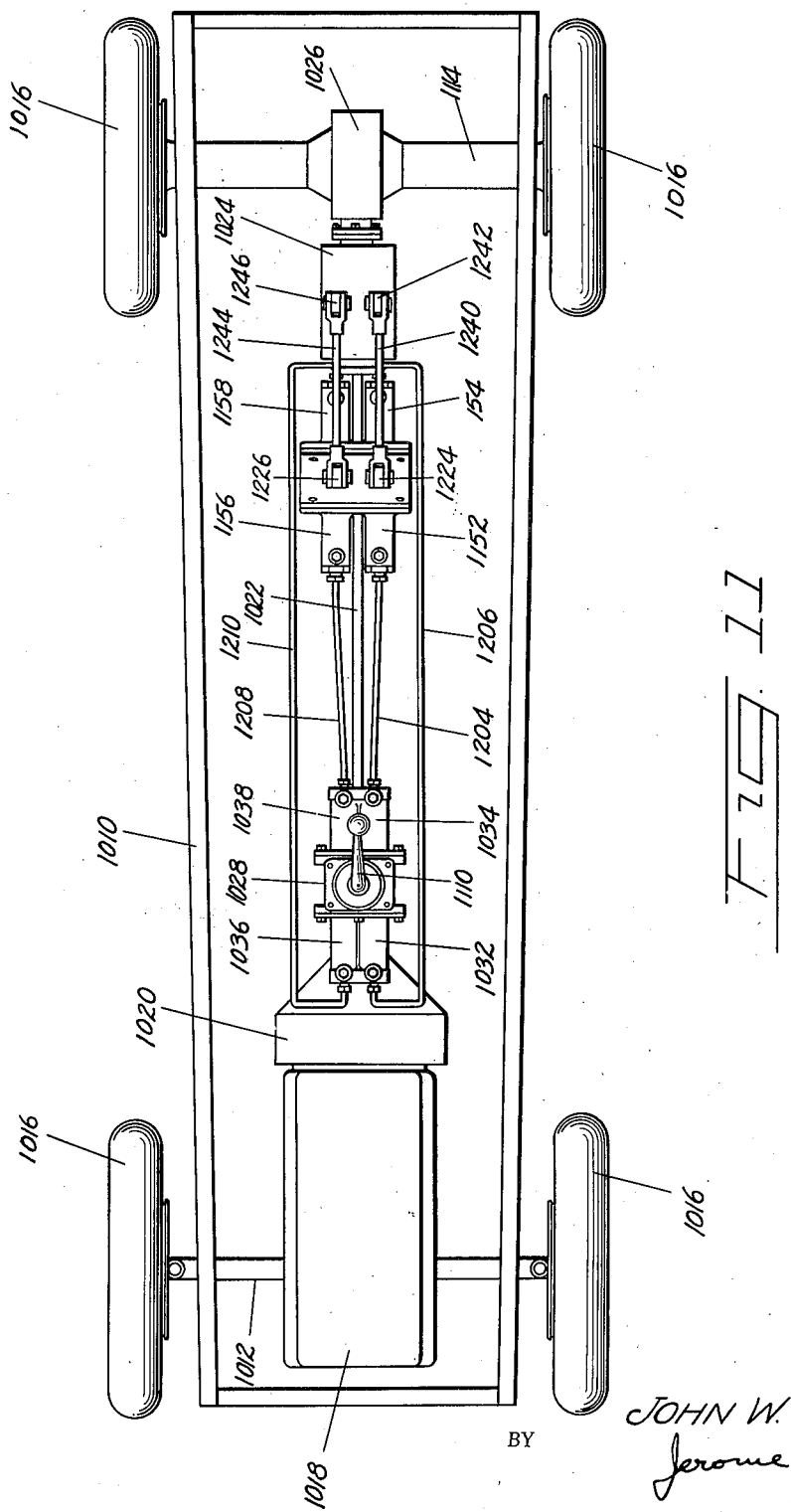
INVENTOR.
JOHN W. WHITE
BY
ATTORNEY.

Patented Nov. 28, 1939

2,181,754

UNITED STATES PATENT OFFICE 2,181,754

HYDRAULIC TRANSMISSION

John William White, South Bend, Ind., assignor to Bendix Products Corporation, South Bend, Ind., a corporation of Indiana Application January 22, 1937, Serial No. 121,748

11 Claims. (Cl. 60—54.5)

This invention relates to gear shifting mechanism.

Broadly the invention comprehends a fluid pressure system for shifting the gears of a motor vehicle transmission including a mechanically operated fluid pressure producing mechanism of a selective type and a fluid pressure actuated mechanism operatively connected thereto and to the shifting elements of the transmission.

An object of the invention is to provide a fluid pressure system.

A more specific object is to provide such a system especially designed for shifting the gears of a motor vehicle transmission.

Another object of the invention is to provide a fluid pressure producing mechanism of a selective type and a fluid pressure actuated mechanism so connected thereto as to perfectly synchronize one mechanism with the other mechanism.

Another object of the invention is to provide a practical and efficient fluid pressure system for shifting the gears of a motor vehicle transmission in which the movement of the gears is so timed that clashing thereof is rendered impossible.

A further object of the invention is to provide a fluid pressure system for shifting the gears of a motor vehicle transmission in which provision is made for maintaining the system completely filled with fluid and free from air.

Yet a further object of the invention is to provide a fluid pressure system for shifting the gears of a motor vehicle transmission in which provision is made for positive action and immediate relief and equalization of pressure in the system upon attaining the action.

A further object is to provide means to shift the gears of a motor vehicle transmission operable at a point remote from the transmission.

Other objects and advantages of the invention will more fully appear from the following description taken in connection with the accompanying drawings illustrative of a preferred embodiment of the invention, and in which:

Fig. 4 is a longitudinal sectional view of the actuating mechanism substantially on line 4—4, Fig. 2;

Fig. 5 is a cross-sectional view of the actuating mechanism substantially on line 5—5, Fig. 2;

Fig. 6 is a cross-sectional view substantially on line 6—6, Fig. 4;

Fig. 9 is a longitudinal sectional view of the actuated mechanism substantially on line 9—9, Fig. 7;

Fig. 10 is a cross-sectional view of the actuated mechanism substantially on line 10—10, Fig. 7; and Fig. 11 is a top plan view similar to Fig. 1 showing a modified arrangement adapted for use on a front engine motor vehicle.

Figure 1:
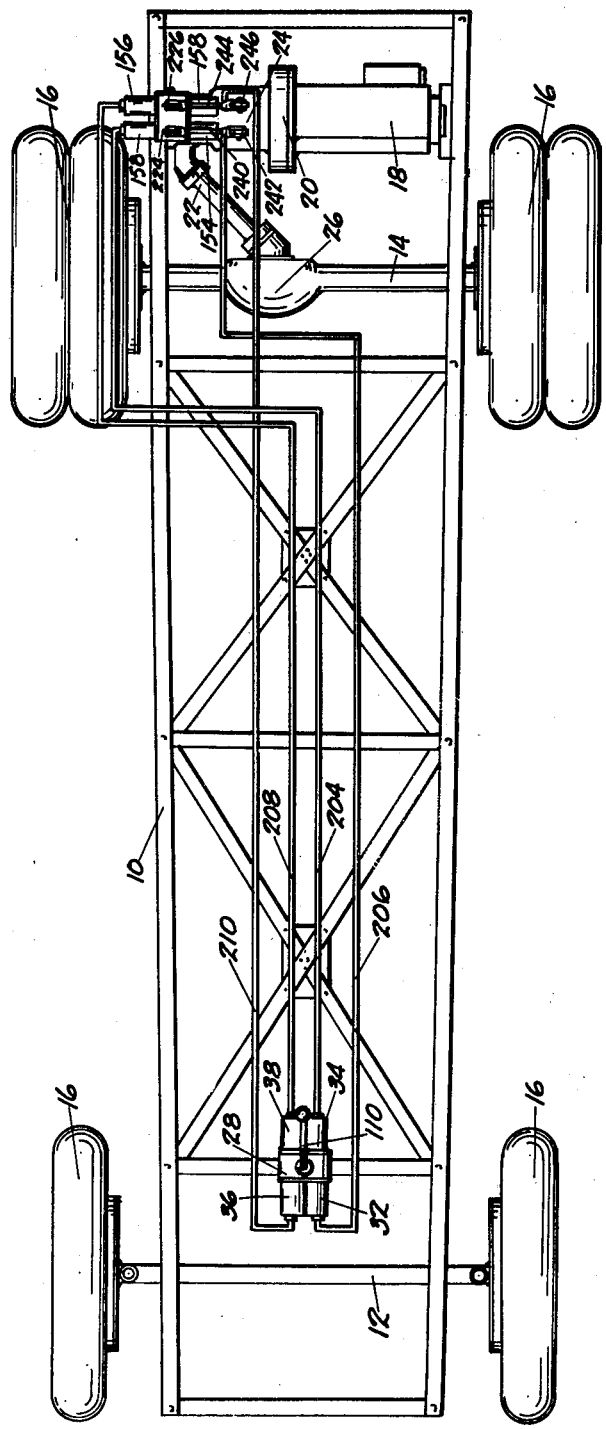
Figure 1 is a top plan view of a motor vehicle chassis illustrating the invention as applied.
Figure 2:
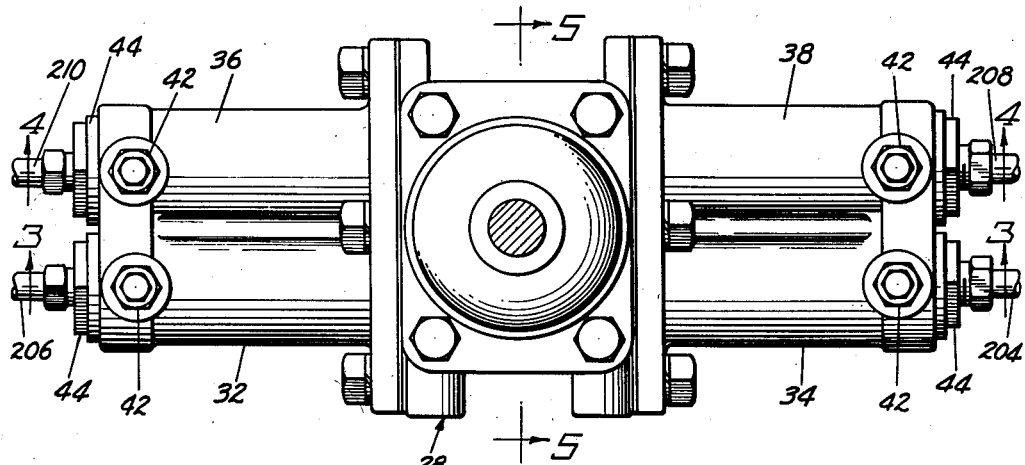
Fig. 2 is a top plan view of an actuating mechanism.
Figure 3:
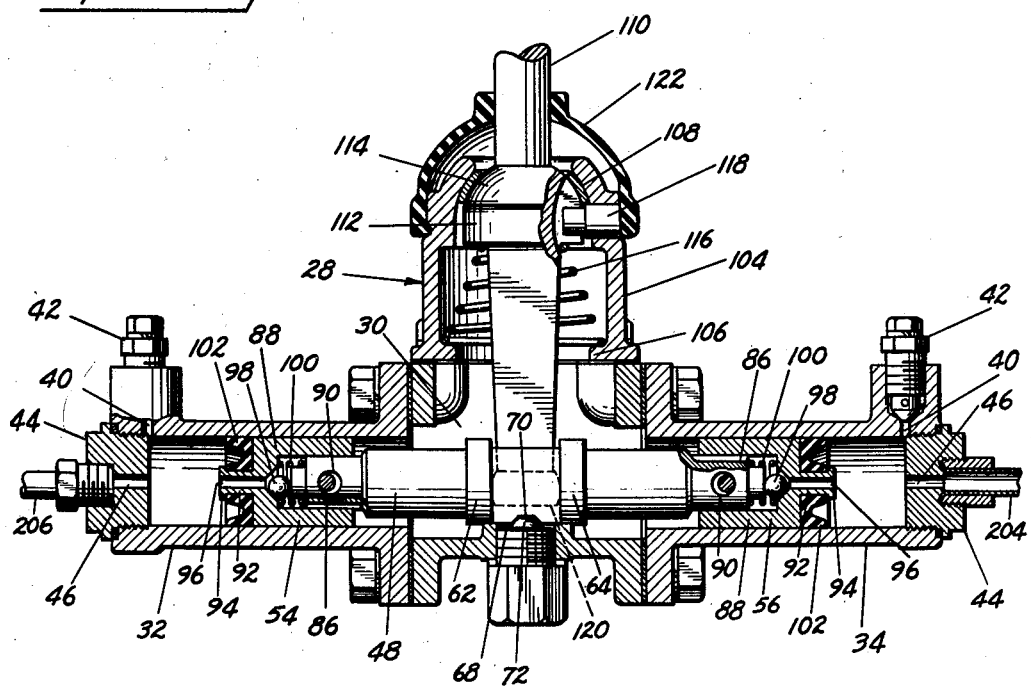
Fig. 3 is a longitudinal sectional view of the actuating mechanism substantially on line 3—3, Fig. 2.
Figure 7:
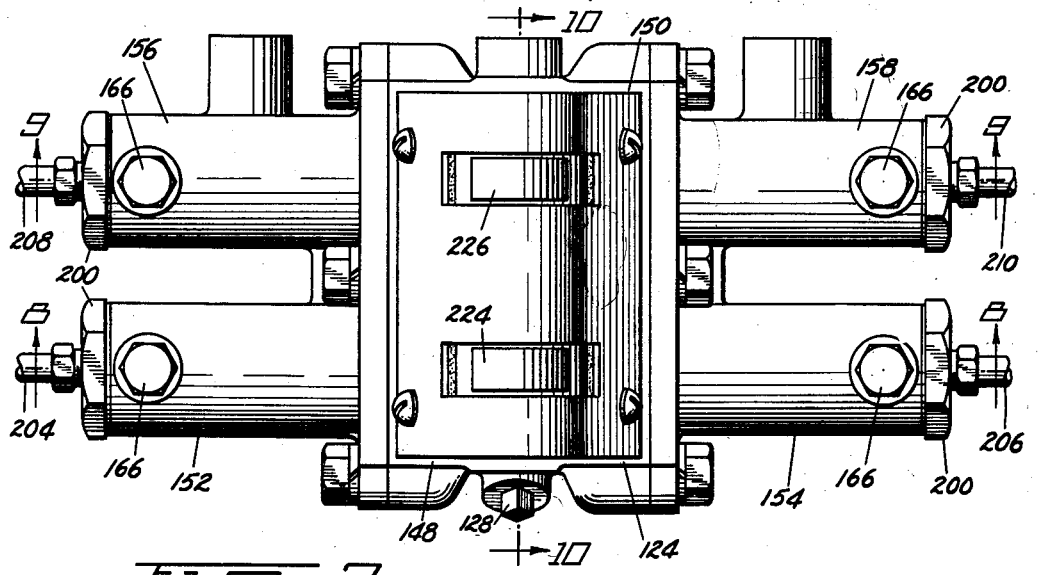
Fig. 7 is a top plan view of the actuated mechanism.
Figure 8:
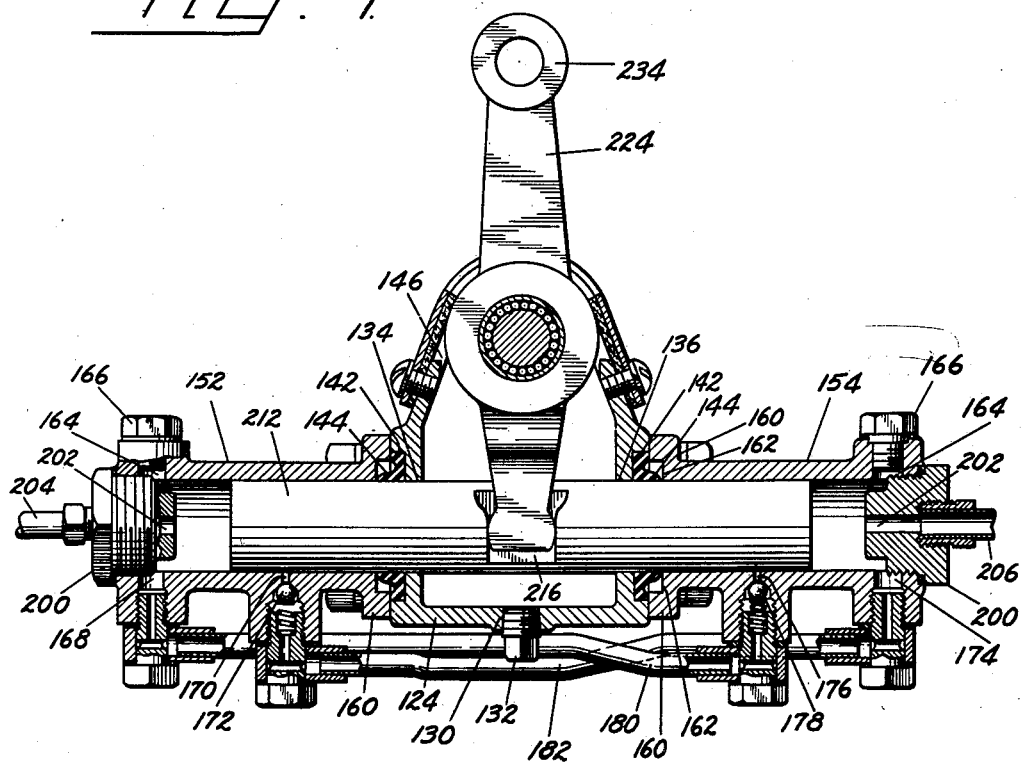
Fig. 8 is a longitudinal sectional view of the actuated mechanism substantially on line 8—8, Fig. 7.

Referring to the drawings for more specific details of the invention, 10 represents the frame of a motor vehicle chassis supported on a front axle 12 and a housing 14 of a rear axle, not shown, and mounted on the axles are wheels 16 of conventional type.

An internal combustion engine or power plant 18 of any preferred type having associated therewith a clutch 20 is suitably supported on the chassis frame 10, and a driving shaft 22 connects the clutch to a transmission 24 of any preferred type mounted on the differential gear housing of the rear axle housing assembly.

Actuating mechanism indicated generally at 28 is in reality a selective fluid pressure producing device including a fluid reservoir 30 having suitably secured to the wall thereof and opening into the reservoir two pairs of oppositely disposed cylinders 32, 34, 36 and 38, each having adjacent its outer end a port 40 normally closed as by a bleeder screw 42, and its outer end closed as by a head 44 having a discharge port 46.

Corresponding double-end pistons 48 and 50 are reciprocable in the opposed cylinders. As shown, the piston 48 has on one end a head 54 reciprocable in the cylinder 32, and on its other end a head 56 reciprocable in the cylinder 34; and, correspondingly, the piston 50 has on one end a head reciprocable in the cylinder 36, and on its other end a head 60 reciprocable in the cylinder 38.

The piston 48 has intermediate its length spaced collars 62 and 64, and between these collars are flats 66 and 68. The flat 66 faces the piston 50 and the flat 68 faces downwardly and is provided with spaced transverse notches 70 arranged for cooperation with a spring-pressed ball 72 for retaining the piston in neutral and advanced positions. Correspondingly, the piston 50 has intermediate its length spaced collars 74 and 76 between which are flats 78 and 80. The flat 78 faces the piston 48 and the flat 80 faces downwardly and is provided with spaced transverse notches 82 in its face for cooperation with a spring-pressed ball 84 for retaining the piston in neutral and advanced positions.

As shown, the respective heads 54, 56, 58 and 60 of the pistons 48 and 50 are slidably mounted on the respective ends of the pistons with sufficient clearance to provide for free passage of fluid between the pistons and the heads. It may be found desirable to provide the respective ends of the pistons with channels such as is shown at 86 so as to insure an uninterrupted passage of fluid between the pistons and the heads. Each head includes a shell 88 attached to the piston by a lost-motion connection 90. The shell has a concentric extension 92 provided with a circumferential flange 94 at its free end, and a passage 96 extending through the shell and the extension is controlled by a ball valve 98 urged to its seat by the piston during the compression stroke thereof.

A spring 100 interposed between the shell and the piston serves to advance the shell when the piston is moved to its retracted or neutral position so as to establish communication between the reservoir 30 and that portion of the cylinder forward of the piston; and a leak-proof cup 102 for inhibiting the seepage of fluid past the piston during the compression stroke of the piston is seated on the shell 88 and embraces the extension 92 where it is held against displacement by the flange 94 on the free end of the extension.

Superimposed on the reservoir 30 is a cylindrical housing 104 having at its base an internal flange 106 and at its upper end an internal semispherical bearing 108 constituting a part of a universal joint. A shifting rod 110 extending through the housing 104 has a collar 112 provided with a bearing surface 114 complementary to the bearing 108 and constituting the other part of the universal joint. A spring sleeved on the rod between the internal flange 106 and the collar 112 serves to retain the universal joint in assembly, and a pin 118 extending through the wall of the housing into a slot in the collar 112 inhibits displacement of the shifting rod. The lower end of the shifting rod is positioned between the pistons 48 and 50 and is provided with an enlarged portion 120 adapted to be received between the collars 62, 64, 74 and 76 and to engage the same by line contact so as to reduce friction. A shield 122 sleeved on the rod embraces the open end of the housing 104 so as to exclude dust and other foreign substances from the housing 104 and consequently from the reservoir 30.

The actuated mechanism includes a housing 124 suitable for the reception of a lubricant. As shown, the housing has a filling opening 126 normally closed as by a plug 128 and a drain opening 130 also normally closed as by a plug 132. The end walls of the housing have corresponding openings 134, 136, 138 and 140 arranged in pairs in oppositely disposed relation. The perimeters defining the respective openings have annular shoulders 142 in which are seated leak-proof washers 144, the object of which will hereinafter appear. The top of the housing is open, as indicated at 146, and the side walls of the housing extend upwardly to provide oppositely disposed flanges or supports 148 and 150.

Corresponding cylinders 152, 154, 156 and 158 are bolted or otherwise secured to the end walls of the housing. These cylinders register with the openings 134, 126, 128 and 140 in the side walls of the housing so as to align the cylinder 152 with the cylinder 154 and the cylinder 156 with the cylinder 158. The inner ends of the cylinders have flanges 160 provided with annular shoulders 162 which form in conjunction with the annular shoulders 142 suitable casings for the leak-proof cups 144, and adjacent their outer ends the cylinders have portions 164 which may be closed as by bleeder screws 166.

The cylinders 152 and 154 are interconnected and the cylinders 156 and 158 are also interconnected. As shown, the cylinder 152 has a port 168 adjacent its outer end and a port 170 intermediate its length controlled as by a spring valve 172. Correspondingly, the cylinder 154 has a port 174 adjacent its outer end and a port 176 intermediate its length controlled as by a spring valve 178. The port 168 of the cylinder 152 is connected by a pipe or conduit 180 to the valve control port 176 of the cylinder 154, and the port 174 of the cylinder 154 is connected by a pipe or conduit 182 to the valve control port 170 of the cylinder 152.

Likewise, the cylinder 156 has a port 184 adjacent its outer end and a port 186 intermediate its length controlled as by a spring-pressed valve 188, and, correspondingly, the cylinder 158 has a port 190 adjacent its outer end and a port 192 intermediate its length controlled as by a spring-pressed valve 194. The port 184 of the cylinder 156 is connected by a pipe or conduit 196 to the valve control port 192 of the cylinder 158, and the port 190 of the cylinder 158 is connected by a pipe or conduit 198 to the valve control port 186 of the cylinder 156.

Each of the cylinders 152, 154, 156 and 158 has a head 200 provided with a discharge port 202. The discharge port of the cylinder 152 is connected by a fluid pressure delivery pipe or conduit 204 to the discharge port in the head of the cylinder 34 of the actuating mechanism. The discharge port of the cylinder 154 is connected by a fluid pressure delivery pipe or conduit 206 to the discharge port in the head of the cylinder 32 of the actuating mechanism. The discharge port of the cylinder 156 is connected by a fluid pressure delivery pipe or conduit 208 to the discharge port in the head of the cylinder 38 of the actuating mechanism, and the discharge port of the cylinder 158 is connected to a fluid pressure delivery pipe or conduit 210 to the discharge port in the head of the cylinder 36 of the actuating mechanism.

Double-end pistons 212 and 214 are reciprocable in the cylinders 152, 154, 156 and 158 and the respective pistons are embraced by the leak-proof cups 144. The piston 212 is reciprocable in the cylinders 152 and 154, and the piston 214 is reciprocable in the cylinders 156 and 158, and each of the pistons has oppositely disposed slots 216 and 218 centrally of its length providing a section of reduced cross-sectional area 220.

The flanges or supports 148 and 150 of the housing 128 are transversely bored for the reception of a shaft 222 having suitably mounted thereon corresponding cross-arms 224 and 226 held apart by a spacer 228 keyed to the shaft by a pin 230. This spacer also serves to retain the shaft against displacement. The lower end of the arm 224 is bifurcated as at 232 for the reception of the reduced section 220 of the piston 212, and the upper end of the arm is provided with an eye 234. Correspondingly, the lower end of the cross-arm 226 is bifurcated as at 236 for the reception of the reduced section 220 of the piston 214, and the upper end is provided with an eye 238. A clevis connected to the eye 234 of the cross-arm 224 is connected to one end of a rod 240, the other end of which is suitably connected to a lever 242 for actuating one of the rails of a transmission, not shown; and, correspondingly, a clevis connected in the eye 238 of the cross-arm 226 is connected to one end of a rod 244, the other end of which is suitably connected to a lever 246 arranged for the actuation of the other rail of the transmission, also not shown.

Assuming that the system is installed substantially as illustrated and filled with suitable fluid, under this condition, when it is desired to shift the transmission gears to reverse position the operator of the vehicle moves the shifting rod 110 in the conventional manner, that is, to the left and then forward. In effecting this movement the knob 120 on the lower end of the rod 110 is first engaged with the piston 48 between the collars 62 and 64, and then force is transmitted from the rod to the piston through the collar 64 to move the piston backward.

During the initial movement of the piston the lost motion connection 90 between the piston and its head 56 is taken up and the ball valve 98 in the head is moved to its seat to close the passage 96 through the head of the piston. Further movement of the piston displaces the fluid in the cylinder 34 forward of the head 56 of the piston through the fluid pressure delivery pipe or conduit 204 into the cylinder 152. When the fluid enters this cylinder the pressure on the fluid is received by the piston 212 resulting in moving the piston 212 backward, and this movement of the piston rocks the cross-arm 224 connected thereto. This movement of the cross-arm is transmitted through the linkage 240 and 242 to one of the rails of the transmission, resulting in moving the rail and thus shifting the gears of the transmission to the reverse position.

During this movement of the piston 212 the fluid in the cylinder 154 is displaced therefrom through the fluid pressure delivery pipe or conduit 206 into the cylinder 32. At the end of the stroke of the piston 212 the port 170 is uncovered and the pressure on the fluid in the cylinder 152 opens the valve 172, resulting in release of pressure on the fluid in the cylinder 34, the fluid pressure delivery pipe 204 and the cylinder 152. It is to be noted that the actuator piston has always a longer stroke than the actuated piston so that the ports 170, 176, 186 and 192 are always uncovered at the end of the respective strokes. Thus there is always a surplus of fluid which insures maintenance of the proper relation of the pistons. Thereupon there is no force tending to move the piston 212, and the spring 100 becomes effective to advance the head 56 so as to establish communication between the cylinder 34 and the reservoir. When the valve 172 opens, any additional fluid entering the cylinder 152 may pass therefrom through the port 170, past the valve 172, thence through the conduit 182 and the port 174 to the cylinder 154, and from this cylinder through the passage 96 in the head 54 of the piston 48 past the valve 98 and through the ducts 86 to the reservoir 30. This completes the operation of shifting the transmission gears to the reverse position.

When it is desired to shift the transmission gears from the reverse position to the first speed forward position, the operator moves the shifting rod 110 backward in the conventional manner. This movement of the rod 110 is transmitted to the piston 48, resulting in moving the piston 48 forward. During the initial movement of the piston, the lost motion connection between the piston and its head 54 is taken up and the valve 98 in the head 54 is moved to its seat to close the passage 96 through the head. Further movement of the piston 48 displaces the fluid in the cylinder 32 forward of the head 54 through the fluid pressure delivery pipe or conduit 206 into the cylinder 154, where the pressure on the fluid is received by the piston 212, resulting in moving the piston 212 forward. This movement of the piston 48 again rocks the cross-arm 224, and this movement of the cross-arm is transmitted through the linkage 240 and 242 to the rail of the transmission, resulting in shifting the gears of the transmission to the first forward speed position.

During this movement of the piston 212, fluid is diplaced from the cylinder 152 through the fluid pressure delivery pipe or conduit 204 to the cylinder 34. When the piston 212 reaches the end of its stroke, the port 176 is uncovered and the pressure on the fluid in the cylinder 154 opens the valve 178, resulting in release of pressure on the fluid in the cylinder 32, the fluid pressure delivery pipe 206, and the cylinder 154. Thereupon there is no further force tending to move the piston 212, and the spring 100 becomes effective to advance the head 54 to establish communication between the cylinder 32 and the reservoir. Upon opening of the valve 178, any additional fluid entering the cylinder 154 passes therefrom through the port 176, past the valve 178, and through the conduit 180 and port 168 to the cylinder 152, and from this cylinder to the cylinder 34, as previously described, and thence through the passage 98 in the head 56 of the piston and the ducts or passages 86 to the reservoir. This completes the operation of shifting the gears of the transmission from the reverse position to the first forward speed position.

In shifting the gears of the transmission from first speed position to the second forward speed position, the operator moves the shifting rod 110 backward to neutral, thence to the right and forward in the conventional manner, and in doing so the knob 120 on the lower end of the rod 110 engages the piston 50 between the collars 74 and 76 and transmits force from the lever through the collar 76 to the piston, resulting in moving the piston backward.

Upon the initial movement of the piston 50, the lost motion connection between the piston and its head 60 is taken up and the valve 98 is moved to its seat to close the passage 96 through the head 60 of the piston. Further movement of the piston 50 displaces the fluid in the cylinder 38 forward of the head 60, through the fluid pressure delivery pipe or conduit 208 into the cylinder 156, where the pressure on the fluid is received on the piston 214 causing the piston to move backward and resulting in rocking the cross-arm 226 connected to the piston, and this movement of the cross-arm 226 is transmitted through the linkage 244 and 246 to the other rail of the transmission, resulting in moving the transmission gears to the second forward speed position.

During this movement of the piston 214, the fluid in the cylinder 158 forward of the piston 214 is displaced therefrom through the fluid pressure delivery pipe or conduit 210 into the cylinder 36. At the end of the stroke of the piston 214 the port 186 is uncovered and the pressure on the fluid in the cylinder 158 opens the valve 188, resulting in release of pressure on the fluid in the cylinder 38, the fluid pressure delivery pipe 208 and the cylinder 156. Thereupon there is no further force tending to move the piston 214, and the spring 100 becomes effective to advance the head 60 so as to establish communication between the cylinder 38 and the reservoir. After the valve 188 opens, any additional fluid entering the cylinder 156 is displaced therefrom through the port 186, past the valve 188, through the conduit 198 and port 190 into the cylinder 158, and from this cylinder to the cylinder 38, as previously described, and thence through the passage 96 in the head 58 of the piston 50, past the valve 98 and through the duct 86, to the reservoir 30.

In shifting the gears of the transmission from the second forward speed position to the third forward speed position, or to full speed ahead, the operator moves the shifting lever 110 backward in the conventional manner. In effecting this movement, force is transmitted from the shifting lever to the piston 50, resulting in moving the piston forward. During the initial movement of the piston, the lost motion connection between the piston and its head 58 is taken up and the valve 98 in the head 58 is moved to its seat so as to close the passage 96 through the head. Further movement of the piston 50 displaces the fluid in the cylinder 36 forward of the head 58 through the fluid pressure delivery pipe or conduit 210 into the cylinder 158, where the pressure on the fluid is received by the piston 214, resulting in moving the piston 214 forward and rocking the cross-arm 226 connected to the piston, and this movement of the cross-arm is transmitted through the linkage 244 and 246 to the rail of the transmission, resulting in shifting the gears of the transmission to the third forward speed position.

During this movement of the piston 214, the fluid in the cylinder 156 forward of the piston 214 is displaced therefrom through the fluid pressure delivery pipe or conduit 208 into the cylinder 38. At the end of the stroke of the piston 214, the port 192 is uncovered, and the pressure on the fluid in the cylinder 158 opens the valve 194, resulting in release of pressure on the fluid in the cylinder 36, the fluid pressure delivery pipe 210 and the cylinder 158. Thereupon there is no further force tending to move the piston 214, and the spring 100 becomes effective to advance the head 58 to establish communicaton between the cylinder 36 and the reservoir. After the valve 194 opens, any additional fluid entering the cylinder 158 is displaced therefrom through the port 192, past the valve 194, through the conduit 196 and the port 184 into the cylinder 156, thence through the fluid pressure delivery pipe or conduit 208 into the cylinder 38, and thence through the passage 96 in the head 58 of the piston, past the valve 98, and through the ducts 86 to the reservoir 30.

During this movement of the piston 214, the fluid in the cylinder 158 forward of the piston 214 is displaced therefrom through the fluid pressure delivery pipe or conduit 210 into the cylinder 36, thence through the passage 96 in the head 58 of the piston 50, past the valve 98 and through the duct 86, to the reservoir 30. At the end of the stroke of the piston 214 the port 186 is uncovered and the pressure on the fluid in the cylinder 158 opens the valve 188, resulting in release of pressure on the fluid in the cylinder 38, the fluid pressure delivery pipe 208 and the cylinder 156. This renders further movement of the piston 214 impossible, and also renders the spring 100 effective to advance the head 60 so as to establish communication between the cylinder 38 and the reservoir. After the valve 188 opens, any additional fluid entering the cylinder 156 is displaced therefrom through the port 186, past the valve 188, through the conduit 198 and port 190 into the cylinder 158, and from this cylinder to the reservoir, as previously described.

In shifting the gears of the transmission from any position to neutral a similar operation occurs. For instance in shifting from second forward position to neutral, the operator moves the shifting lever 110 backward in the conventional manner. In effecting this movement, force is transmitted from the shifting lever to the piston 50, resulting in moving the piston forward. During the initial movement of the piston, the lost motion connection between the piston and its head 58 is taken up and the valve 98 in the head 58 is moved to its seat so as to close the passage 96 through the head. Further movement of the piston 50 displaces the fluid in the cylinder 36 forward of the head 58 through the fluid pressure delivery pipe or conduit 210 into the cylinder 158, where the pressure on the fluid is received by the piston 214, resulting in moving the piston 214 forward and rocking the cross-arm 226 connected to the piston, and this movement of the cross-arm is transmitted through the linkage 244 and 246 to the rail of the transmission, resulting in shifting the gears of the transmission to the neutral position.

During this movement of the piston 214, the fluid in the cylinder 156 forward of the piston 214 is displaced therefrom through the fluid pressure delivery pipe or conduit 208 into the cylinder 38.

When the shifting lever is released the spring 100 is effective to retract the piston 50 and establish communication between the cylinder 36 and the reservoir. Thereupon all pressure in the system is released and all parts of the system communicate freely with the reservoir to compensate for expansion and contraction of liquid.

Thus is explained the four stages of shifting to operative position and the operation of shifting to the neutral position. In the arrangement of Figure 11, the application of my invention to a vehicle having a front engine drive is shown. Therein the same numerals are used as are used in Figure 1 with the addition of 1000.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is,

1. A fluid pressure system comprising a pressure producing device comprising a pair of aligned cylinders having a reservoir formed therebetween, a pair of pistons in said cylinders, an actuating lever for said pistons, a connecting rod connected to said actuating lever and connected with said pistons by lost motion devices in said reservoir, said pistons each being formed with a central passageway and provided with a ball check valve arranged to be contacted by said connecting devices so that the check valve is forced to its seat upon actuation of said piston, but otherwise leaves its seat to allow passage of liquid through said piston to the reservoir, in combination with a fluid pressure actuated device including a pair of cylinders, a housing in which the cylinders are supported, a pair of pistons reciprocable in the opposed cylinders in opposite directions, fluid delivery means connecting each of said cylinders of the pressure producing device with one of the cylinders of the fluid pressure actuated device, and means connecting each of the cylinders of the fluid pressure actuated device with the other cylinder of the fluid pressure actuated device through a port in said first named cylinder normally covered but uncovered by the movement of said actuated piston at the end of the stroke of said actuated piston.

2. A fluid pressure system comprising a pressure producing device including a reservoir, a pair of cylinders supported on the reservoir in oppositely disposed relation to one another, pistons reciprocable in the opposed cylinders, means for selectively actuating the pistons and for cutting off communication between the reservoir and the cylinder in which pressure is being produced upon actuation of the corresponding piston, both of said cylinders being open to the reservoir except when one of said pistons is being actuated to produce pressure and the inactive cylinder being then open to the reservoir, in combination with a fluid pressure actuated device comprising a pair of aligned cylinders and a single piston extending part way to each of said cylinders, the cylinders each having inlet ports at the ends opposite said piston and each having relief ports uncovered by the piston at the conclusion of its stroke farthest from the inlet port for said cylinder and each having a compensating port in one side of the cylinder adjacent to the inlet port, and conduits connecting the relief port of each cylinder with the compensating port of the other cylinder, together with check valves associated with each of the relief ports preventing passage of liquid into the cylinder from the associated conduit through the relief port, and a lever connected to said piston to be actuated thereby.

3. A fluid pressure system comprising a pressure producing device, said fluid pressure producing device comprising a pair of aligned cylinders having a reservoir provided therebetween, a pair of pistons in said cylinders, an actuating lever for said pistons, a connecting rod connected to said actuating lever and connected with said pistons by lost motion devices in said reservoir, said pistons each being formed with a central passageway and provided with a ball check valve arranged to be contacted by said connecting devices so that the check valve is forced to its seat upon actuation of said piston, but otherwise leaves its seat to allow passage of liquid through said piston to the reservoir, in combination with a fluid pressure actuated device comprising a pair of aligned cylinders and a single piston extending part way to each of said cylinders, the cylinders each having inlet ports at the ends opposite said piston and each having relief ports uncovered by the piston at the conclusion of its stroke farthest from the inlet port for said cylinder and each having a compensating port in one side of the cylinder adjacent to the inlet port, and conduits connecting the relief port of each cylinder with the compensating port of the other cylinder, together with check valve associated with each of the relief ports preventing passage of liquid into the cylinder from the associated conduit through the relief port, and a lever connected to said piston to be actuated thereby.

4. A fluid pressure system comprising a pressure producing device including a reservoir, a pair of cylinders supported on the reservoir in oppositely disposed relation to one another, pistons reciprocable in the opposed cylinders, means for selectively actuating the pistons and for cutting off communication between the reservoir and the cylinder in which pressure is being produced upon actuation of the corresponding piston, both of said cylinders being open to the reservoir except when one of said pistons is being actuated to produce pressure and the inactive cylinder being then open to the reservoir, and means for by-passing fluid through the heads of the respective pistons in the pressure producing cylinders which means is operable at all times unless the respective piston is engaged in a pressure producing stroke, in combination with a fluid pressure actuated device including a pair of cylinders, a housing in which the cylinders are supported, a pair of pistons reciprocable in the opposing cylinders in opposite directions, fluid delivery means connecting each of said fluid pressure producing cylinders with one of said fluid pressure actuated cylinders, and means connecting each of said fluid pressure actuated cylinders with the other fluid pressure actuated cylinder through a port in said first named cylinder normally covered but uncovered by the movement of said actuated piston at the end of the stroke of said actuated piston.

5. A fluid pressure system comprising a pressure producing device including a reservoir, a pair of cylinders supported on the reservoir in oppositely disposed relation to one another, pistons reciprocable in the opposed cylinders and effective in each direction of movement in the opposed cylinders, means for selectively actuating the pistons and for cutting off communication between the reservoir and the cylinder in which pressure is being produced upon actuation of the corresponding piston, both of said cylinders being open to the reservoir except when one of said pistons is being actuated to produce pressure and the inactive cylinder being then open to the reservoir, in combination with a fluid pressure actuated device including a pair of cylinders, a housing in which the cylinders are supported, a pair of pistons reciprocable in the opposing cylinders in opposite directions, fluid delivery means connecting each of the cylinders of the pressure producing device with one of the cylinders of the fluid pressure actuated device, and means connecting each of the cylinders of the fluid pressure actuated device with the other cylinder of the fluid pressure actuated device through a port in said first named cylinder normally covered but uncovered by the movement of said actuated piston at the end of the stroke of said actuated piston, the pressure producing means including heads on the respective ends of the pistons, valves in the heads, means for normally advancing the heads to open the valves, and means on the reservoir for selectively actuating the pistons, the heads being attached to the respective ends of the pistons by lost motion connections and the means for actuating the piston comprising a lever supported on the reservoir having a part adapted to selectively engage the piston.

6. A fluid pressure system comprising a pressure producing device including a reservoir, a pair of cylinders supported on the reservoir in oppositely disposed relation to one another, pistons reciprocable in the opposed cylinders, means for selectively actuating the pistons and for cutting off communication between the reservoir and the cylinder in which pressure is being produced upon actuation of the corresponding piston, both of said cylinders being open to the reservoir except when one of said pistons is being actuated to produce pressure and the inactive cylinder being then open to the reservoir, in combination with a fluid pressure actuated device including a pair of cylinders, a housing in which the cylinders are supported, a pair of pistons reciprocable in the opposing cylinders in opposite directions, fluid delivery means connecting each of the cylinders of the pressure producing device with one of the cylinders of the fluid pressure actuated device, and means connecting each of the cylinders of the fluid pressure actuated device with the other cylinder of the fluid pressure actuated device through a port in said first named cylinder normally covered but uncovered by the movement of said actuated piston at the end of the stroke of said actuated piston, said fluid pressure actuated device having valves, one of which is at times connected with each cylinder by means of a port positioned at a predetermined extreme position of the respective piston, and fluid delivery means connecting the valve of each cylinder to the opposed cylinder.

7. A fluid pressure system comprising a pressure producing device including a reservoir, a pair of cylinders supported on the reservoir in oppositely disposed relation to one another, pistons reciprocable in the opposed cylinders, means for selectively actuating the pistons and for cutting off communication between the reservoir and the cylinder in which pressure is being produced upon actuation of the corresponding piston, both of said cylinders being open to the reservoir except when one of said pistons is being actuated to produce pressure and the inactive cylinder being then open to the reservoir, in combination with a fluid pressure actuated device, including a housing, a pair of cylinders supported on the housing in oppositely disposed relation to one another and in communication with the housing, a pair of pistons reciprocable in the opposed cylinders, fluid delivery means connecting each cylinder by means of a port positioned at a predetermined extreme position of the respective piston with its opposing cylinder, valves controlling the fluid delivery means, a shaft supported on the housing, and cross arms rockable on the shaft and operatively connected to the pistons.

8. A fluid pressure system comprising a pressure producing device including a reservoir, a pair of cylinders supported on the reservoir in oppositely disposed relation to one another, pistons reciprocable in the opposed cylinders, means for selectively actuating the pistons and for cutting off communication between the reservoir and the cylinder in which pressure is being produced upon actuation of the corresponding piston, both of said cylinders being open to the reservoir except when one of said pistons is being actuated to produce pressure and the inactive cylinder being then open to the reservoir, in combination with a fluid pressure actuated device including a housing, a pair of cylinders supported on the housing in oppositely disposed relation to one another and in communication with the housing, a leak-proof washer between the housing and the respective cylinders, conduits connecting each cylinder intermediate its length with the outer end of its opposed cylinder, means controlling the conduits, a pair of pistons reciprocable in the opposed cylinders through the leak-proof washers and adapted to uncover the openings of said conduits when in predetermined extreme position, a shaft supported on the housing, a cross arm rockable on the shaft, and operatively connected to the pistons.

9. A fluid pressure system comprising a fluid pressure producing device having cylinders, in combination with a fluid pressure actuated device including a pair of cylinders, a housing in which the cylinders are supported, a pair of pistons actuated by said pressure producing device reciprocable in the opposing cylinders in opposite directions, fluid delivery means connecting each of said fluid pressure producing cylinders with one of said fluid pressure actuated cylinders, and means connecting each of the cylinders of the fluid pressure actuated device with the other cylinder of the fluid pressure actuated device through a port in said first named cylinder normally covered but uncovered by the movement of said actuated piston at the end of the stroke of said actuated piston, said fluid pressure actuated device having valves, one of which is at times connected with each cylinder by means of a port positioned at a predetermined extreme position of the respective piston, and fluid delivery means connecting the valve of each cylinder to the opposed cylinder.

10. A fluid pressure system comprising a pressure producing device comprising a pair of aligned cylinders having a reservoir formed therebetween, a pair of pistons in said cylinders, an actuating lever for said pistons, a connecting rod connected to said actuating lever and connected with said pistons by lost motion devices in said reservoir, said pistons each being formed with a central passageway and provided with a ball check valve arranged to be contacted by said connecting devices so that the check valve is forced to its seat upon actuation of said piston, but otherwise leaves its seat to allow passage of liquid through said piston to the reservoir, in combination with a fluid pressure actuated device.

11. A fluid pressure system comprising a pressure producing device in combination with a fluid pressure actuated device, comprising a pair of aligned cylinders and a single piston extending part way to each of said cylinders, the cylinders each having inlet ports at the ends opposite said piston and each having relief ports uncovered by the piston at the conclusion of its stroke farthest from the inlet port for said cylinder and each having a compensating port in one side of the cylinder adjacent to the inlet port, and conduits connecting the relief port of each cylinder with the compensating port of the other cylinder, together with check valves associated with each of the relief ports preventing passage of liquid into the cylinder from the associated conduit through the relief port, and a lever connected to said piston to be actuated thereby.

JOHN WILLIAM WHITE.